April 29, 1930. C. M. THOMSON 1,756,403
METHOD OF ELECTRICALLY WELDING PIPES
Filed Jan. 18, 1929 2 Sheets-Sheet 1
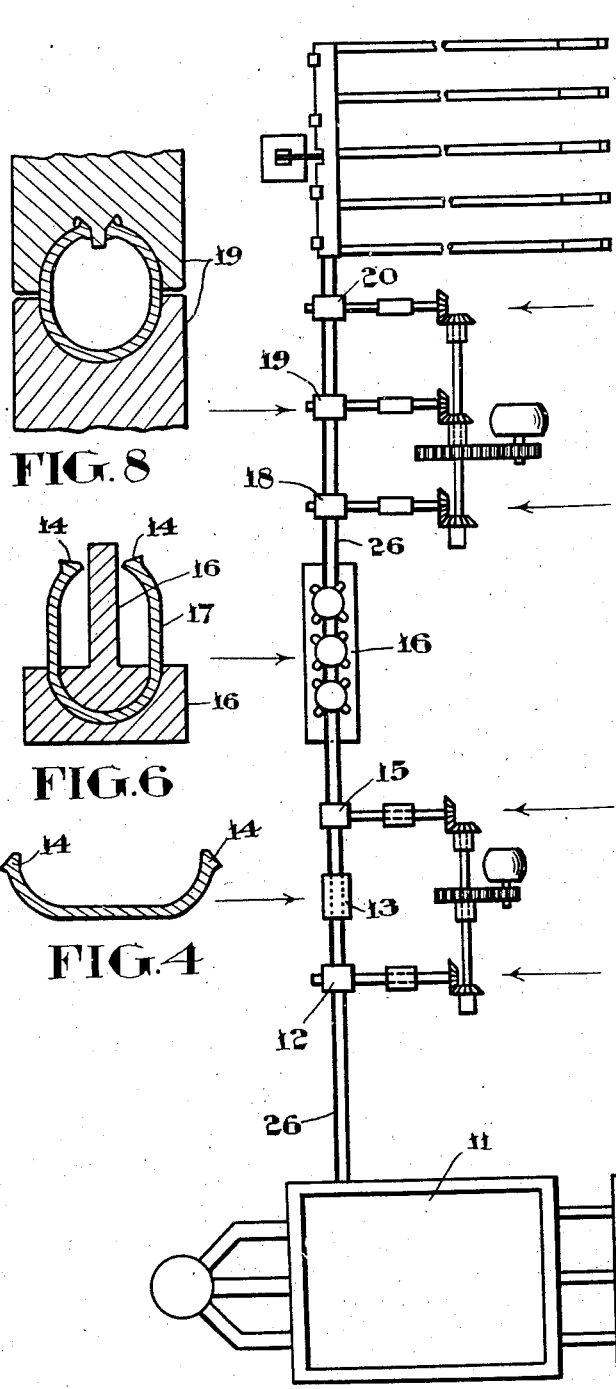
FIG.1
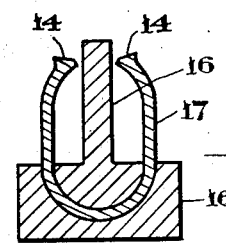
FIG.8
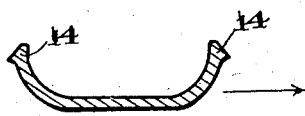
FIG.6
FIG.4
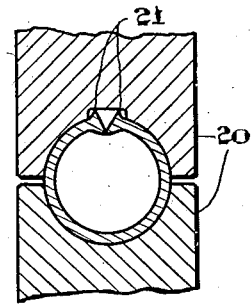
FIG.9
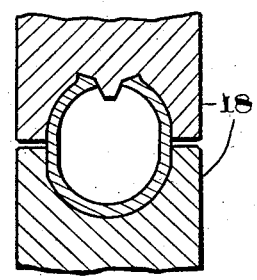
FIG.7
FIG.5
FIG.3
FIG.2
INVENTOR
CHARLES. M. THOMSON
BY *Fetherstonhaugh & Co*
ATTORNEYS April 29, 1930.   C. M. THOMSON   1,756,403
METHOD OF ELECTRICALLY WELDING PIPES
Filed Jan. 18, 1929   2 Sheets-Sheet 2

INVENTOR
CHARLES.M.THOMSON
BY Featherstonhaugh&Co
ATTORNEYS

Patented Apr. 29, 1930

1,756,403

UNITED STATES PATENT OFFICE

CHARLES M. THOMSON, OF WESTMOUNT, QUEBEC, CANADA

METHOD OF ELECTRICALLY WELDING PIPES

Application filed January 18, 1929. Serial No. 333,372.

This invention relates to new and useful improvements in the method of manufacturing welded tubes, pipes and the like and particularly to the method of preparing the skelp for receiving the welding material and also to the welding of the pipe electrically.

The main object of the invention is to make an electric arc welded joint which will extend from the outside to almost the inner surface of the pipe, or tube, the weld being equal, or more than equal in strength to the remaining section of the pipe.

Another object is to provide a method which will greatly reduce the present costs of manufacture and which will result in a better product than has heretofore been possible.

According to my improved method the strip or skelp from which the pipe or tube is made is heated by any convenient means and fed through suitable devices for forming and upsetting the edges so that when they are brought into butting relation, said edges are prepared to receive the welding rod. The weld is made electrically and in such a manner that the thickness of the weld is substantially the same or gerater than the thickness of the wall of the pipe or thickness of the skelp or strip. The thickness of the pipe at the weld is such that the weld does not penetrate to the inner wall of the pipe.

In the drawings which illustrate my invention:

Figure 1 is a diagrammatic plan of means which may be employed in making my improved welded pipe in one continuous operation.

Figure 2 designates the skelp from which the pipe is made.

Figures 3 to 9 inclusive show diagrammatically and in cross section the various steps employed in the making of the pipe and the preparation of same for the welding process.

Figure 12:
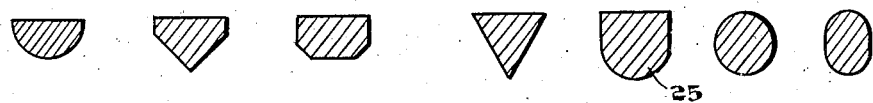
Figure 12 shows various forms of welding rods which may be employed in my method.
Figure 10:
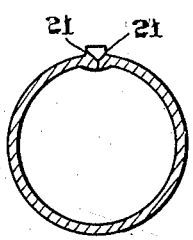
Figures 10 and 11 show modified types of joints which may be made according to my invention.

Referring more particularly to the drawings, 11 designates a furnace to which the skelp in the form shown in Figure 2 is fed. The skelp is fed through the furnace and enters one or more sets of bending rolls 12 and is bent into the form of a flat U shape as shown in Figure 3. The skelp in this form is then fed through a series of rolls or hammers designated 13 which contact with the edges and upset same so that said edges are thicker than the normal thickness of the skelp, as designated 14 in Figure 4. The skelp then passes through bending and edge finishing rolls designated 15. The rolls 15 curve the skelp between the upturned portions as shown in Fig. 5. From the bending rolls the skelp then passes into a forming press 16 the skelp being bent to a less radius than in the last operation so that the general appearance of the skelp at this operation is a deep U shape with the thickened or prepared edges turned upwardly and the side portions 17 substantially vertical as shown in Figure 6. In Figures 7, 8 and 9 the skelp is shown as its passes through the rounding rolls designated 18, 19 and 20 and as will be seen the deep U shape is gradually formed into a round section with the edges of the skelp butting against one another and forming a V shaped joint with the remote edges 21 of the V thicker than the normal thickness of the skelp. The pipe when it passes through the rolls 20 is then ready to receive the welding rod which in this case is preferably of triangular cross section adapted to fit into the V joint between the edges of the skelp. The welding rod is fed in any suitable manner such as from a reel 22 into the V shaped joint and is then passed under the electrode 23 of a welding apparatus which is connected in the usual manner to a source of current supply. The electrode is spaced from the welding rod so that the resultant arc between the live electrode and the bar melts the bar and the adjacent edges of the skelp so that they unite or weld together into a homogeneous mass, the thickness of which is greater than the normal thickness of the pipe. In making my joint, I prefer to space the electrode from the bar so that the heat of the arc does not penetrate to the inner wall of the pipe, thereby eliminating any necessity for using a support under the joint.

Figure 11:
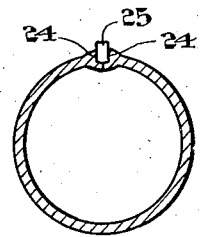
Figure 13:
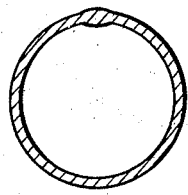
Figure 13 is a cross sectional area of my improved product.
Figure 14:
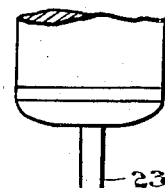
Figure 14 is a cross sectional view of the pipe showing the welding electrode positioned above the welding rod.
Figure 15:
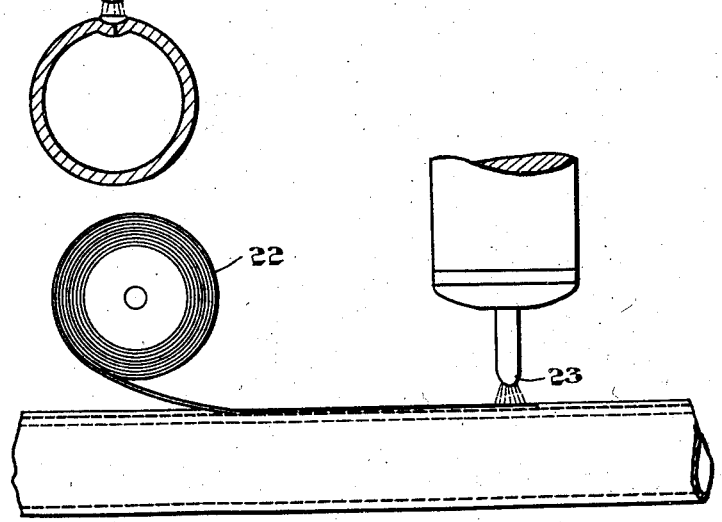
Figure 15 is a diagrammatic illustration showing one method of feeding the welding rod to the joint between the edges of the pipe or tube.

In Figure 11 the abutting edges 24 of the skelp are shown forming a U, and a U shaped bar 25 is preferably used in this case.

Figure 12 shows seven different types of welding bars which may be used and the abutting edges of the rounded skelp may be formed in specially constructed upsetting and forming hammers (not shown) to receive the different types of welding bars.

The drawings show diagrammatically the method of carrying the skelp through the machine on suitable conveyors 26 of any of the well known types. The forming press 16 is made long enough to receive the standard length of pipe under manufacture. The method of manufacture herein described is simple and the resultant product is a pipe, the joint of which is as strong as the wall of the pipe.

What I claim is:

1. The method of making welded pipe which consists in bending upwardly the sides of a strip of skelp to form a channel, thickening the upturned edges, gradually bringing the edges of the skelp into abutting relation placing a welding strip in the groove between the adjacent edges and electrically welding the strip and the edges of the skelp so that the weld does not quite penetrate the pipe wall, but makes the depth of the weld substantially the thickness of the skelp.

2. The method of making welded pipe which consists in bending a strip of skelp to form a channel, thickening the edges of the channel, bringing the skelp into a substantially tubular form with the edges abutting and a groove above said edges, fitting into said groove a welding strip of greater sectional area than the groove and electrically welding the edges of the skelp and the welding strip to form a homogeneous joint which is substantially the thickness of the tube but in which the weld does not penetrate entirely through the joint.

3. The method of making welded pipe which consists in upsetting or thickening the edges of a strip of skelp, forming the skelp into substantially tubular form with the lower adjacent edges in abutting relation and the upper edges separated by a space or groove, fitting into said groove a welding strip and then heating the welding strip to welding temperature from the outside in such a manner than the depth of heat penetration does not penetrate the pipe but is substantially the same thickness as the thickness of the skelp.

In witness whereof, I have hereunto set my hand.

CHARLES M. THOMSON.